United States Patent [19]

MacDonald et al.

[11] Patent Number: 5,149,673
[45] Date of Patent: Sep. 22, 1992

[54] SELECTIVE CHEMICAL VAPOR DEPOSITION OF TUNGSTEN FOR MICRODYNAMIC STRUCTURES

[75] Inventors: Noel C. MacDonald; Liang-Yuh Chen; Zuoying L. Zhang, all of Ithaca, N.Y.

[73] Assignee: Cornell Research Foundation, Inc., Ithaca, N.Y.

[21] Appl. No.: 762,492

[22] Filed: Sep. 19, 1991

Related U.S. Application Data

[62] Division of Ser. No. 313,206, Feb. 21, 1989, Pat. No. 5,072,288.

[51] Int. Cl.$^5$ .......................................... H01L 21/283
[52] U.S. Cl. ...................................... 437/192; 437/24; 437/182; 437/195; 437/245; 437/203
[58] Field of Search ............... 437/203, 192, 182, 195, 437/245, 24

[56] References Cited

U.S. PATENT DOCUMENTS

| | | |
|---|---|---|
| 3,039,897 | 6/1962 | Waring et al. . |
| 3,641,373 | 2/1972 | Elkuch . |
| 3,672,985 | 6/1972 | Nathanson et al. . |
| 3,769,531 | 10/1973 | Elkuch . |
| 3,835,338 | 9/1974 | Martin . |
| 4,011,144 | 3/1977 | Bachman ............................ 437/182 |
| 4,203,128 | 5/1980 | Guckel et al. . |
| 4,319,397 | 3/1982 | Tanabe et al. . |
| 4,348,650 | 9/1982 | Minagawa et al. . |
| 4,381,672 | 3/1983 | O'Connor et al. . |
| 4,516,148 | 5/1985 | Barth . |
| 4,517,486 | 5/1985 | Andrews . |
| 4,570,139 | 2/1986 | Kroll . |
| 4,654,555 | 3/1987 | Ohba et al. . |
| 4,697,118 | 3/1987 | Harnden, Jr. et al. . |
| 4,706,374 | 11/1987 | Murakami . |
| 4,746,621 | 5/1988 | Thomas . |
| 4,754,185 | 6/1988 | Gabriel et al. . |
| 4,772,928 | 9/1988 | Dietrich et al. . |
| 4,776,924 | 10/1988 | Delapierre . |
| 4,788,158 | 11/1988 | Chatterjee ............................. 437/51 |
| 4,789,803 | 12/1988 | Jacobsen et al. . |
| 4,805,033 | 2/1989 | Seligson . |
| 4,835,585 | 5/1989 | Panousis .............................. 437/203 |
| 4,906,840 | 3/1990 | Zdeblick et al. . |
| 4,956,619 | 9/1990 | Hornbeck . |
| 4,959,515 | 9/1990 | Zavracky et al. . |
| 4,983,535 | 1/1991 | Blanchard ............................ 437/40 |
| 5,057,450 | 10/1991 | Bronner et al. ...................... 437/203 |

FOREIGN PATENT DOCUMENTS

| | | |
|---|---|---|
| 57-10270 | 1/1982 | Japan . |
| 62-232171 | 10/1987 | Japan . |
| 63-136982 | 6/1988 | Japan . |
| 2101404A | 1/1983 | United Kingdom . |

OTHER PUBLICATIONS

"Micromechanical Light Deflector Array", Petersen, IBM Technical Disclosure Bulletin, vol. 20, No. 1, Jun. 1977, pp. 355-356.
"Nanostructure for High Resolution Measurement of Magnetic Fields", IBM Technical Disclosure Bulletin, vol. 29, No. 1, Jun. 1986, pp. 312-314.
Trimmer, W. et al., "Design Considerations for A Practical . . . ", Sensors and Actuators, 11(1987) 198-206.

*Primary Examiner*—T. N. Quach
*Attorney, Agent, or Firm*—Jones, Tullar & Cooper

[57] ABSTRACT

A selective chemical vapor deposition (CVD) tungsten process is used to fabricate three-dimensional tungsten cantilever beams on a substrate. Two beams form micromechanical tweezers that move in three dimensions by the application of potential differences between the beams, and between the beams and the silicon substrate. A high deposition rate selective tungsten CVD process is used to fabricate beams of greater than 3 micrometers thickness in patterned, CVD silicon dioxide trenches ion-implanted with silicon. Tweezers 200 micrometers in length with a cross section of 2.7 by 2.5 micrometers will close upon application of a voltage of less than 150 volts.

14 Claims, 5 Drawing Sheets

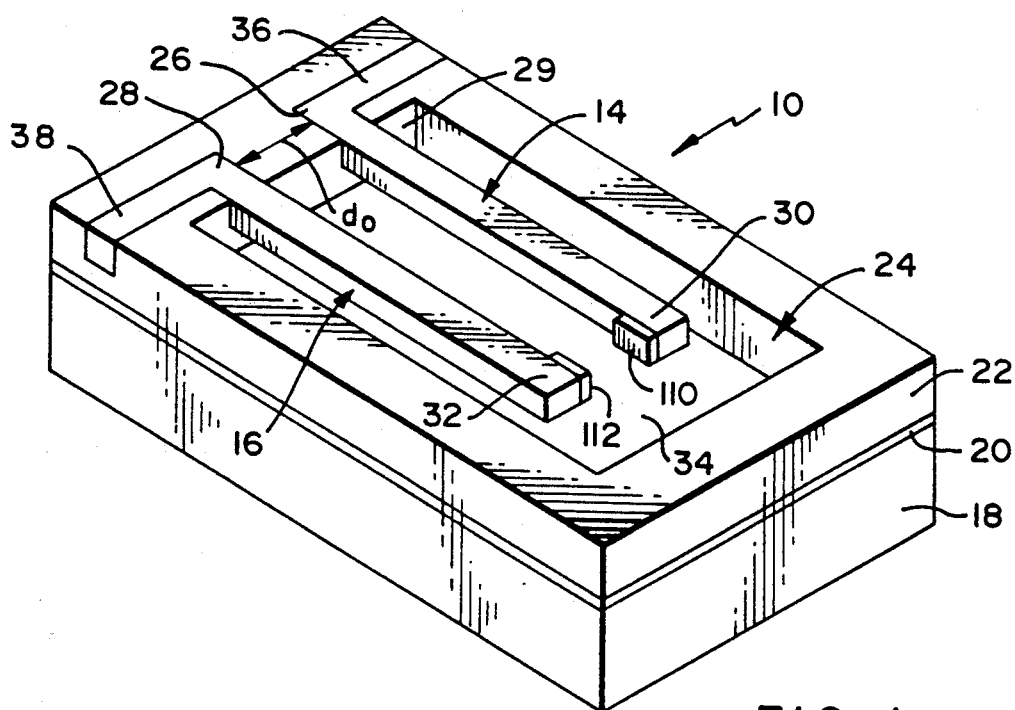
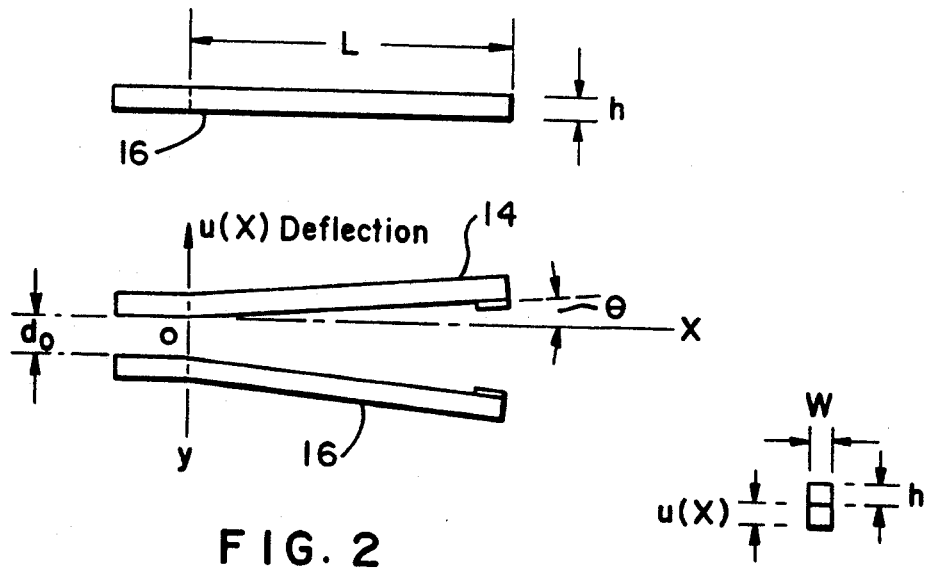
FIG. 3
FIG. 1
FIG. 2
FIG. 4

SELECTIVE CHEMICAL VAPOR DEPOSITION OF TUNGSTEN FOR MICRODYNAMIC STRUCTURES

BACKGROUND OF THE INVENTION

This invention was made with Government support under Grants Nos. ECS-8815775 and ECS-8805866 awarded by the National Science Foundation. The Government has certain rights in the invention.

This is a divisional of copending application Ser. No. 07/313,206, filed on Feb. 21, 1989, now U.S. Pat. No. 5,072,288, issued Dec. 10, 1991.

The present invention relates, in general, to a process for producing microdynamic structures and to the structures produced by that process, and more particularly is directed to the fabrication of three-dimensional tungsten cantilever beams on a substrate.

The field of micro-electromechanical systems is a new, emerging technology which has as its goal the integration of electronic circuits, sensors, and electromechanical motion devices to build complete electromechanical systems on a micrometer scale. Recent research interest in such system has focused on the fabrication of microactuators and micromotors which have applications as micromechanical positioners, robotic actuators, and microprobes. Recent research has shown that rotating and sliding structures can be fabricated using modified silicon processing. To date, research emphasis has been directed toward the fabrication of movable microstructures using polycrystalline silicon with sacrificial layers which, upon removal, releases the microstructures for motion. One disadvantage of the present technology is that the deposition of only relatively thin layers of polysilicon are practical, and thus the silicon micromechanical structures are usually planar structures that are not easily extended to three dimensions. Furthermore, these structures are fragile and require many process steps to create a movable, free structure.

Silicon-based electrostatic actuators and electrostatic motors are crucial to the construction of integrated micro-electromechanical systems. However, attempts to achieve motion in microdevices have been impeded by the complexity of the processes required to build three dimensional structures, and by the forces that make materials stick together upon contact, to impede or prevent relative motion. Four major challenges to the production of a working micro motor have been identified as being the control of friction and wear; the control of surface charges and interfacial forces; the development of a process that produces movable parts; and the control of stress, especially in the movable parts. The first two challenges require considerable experimental research to measure and identify the controlling parameters, while the third and fourth challenges are very closely related since a movable structure must conform to a designed shape, whereas stress plays a major role in distorting a structure when it is released from a mold.

SUMMARY OF THE INVENTION

The present invention is directed, in general, to a chemical vapor deposition (CVD) tungsten/silicon process for fabricating movable structures for electrostatic actuators and motors. The movable actuator is fabricated on a suitable substrate such as a silicon chip, with careful attention being given to production of a structure which permits measurement of friction, stress, and electrostatic forces to enable the production of a stress-free device capable of mechanical motion under the control of applied electrostatic voltages.

Thin films several micrometers in thickness can be deposited using chemical vapor deposition processes. Both CVD silicon dioxide and CVD tungsten processes have been developed with deposition rates of greater than 1,000 angstroms per minute. As described in U.S. Pat. No. 4,746,621 of David C. Thomas et al, assigned to the assignee of the present application, the disclosure of which is incorporated herein by reference, a selective tungsten on silicon process has been developed for producing patterned integrated circuit metal layers. This process uses patterned CVD silicon dioxide trenches which are ion implanted with silicon to make patterned tungsten microstructures. In accordance with that patent, the CVD tungsten seeds only on the silicon implanted at the bottom of the trenches, and continues to grow vertically while filling the trenches from wall to wall. No anisotropic tungsten etch is required to produce high aspect ratio tungsten structures in accordance with that process.

The present invention is an extension of the selective tungsten CVD process described in the aforesaid U.S. Pat. No. 4,746,621 to produce stress-free cantilever beams that can be deflected using applied electric fields. In accordance with this process, a pair of beams form the arms of microtweezers which can be deflected in both the X-Y plane, which is the plane of the two beams and which preferably is parallel to the plane of the substrate, and in the Z direction perpendicular to the substrate plane, by the application of potential differences between the tweezer arms or between the tweezer arms and the substrate, respectively. The application of such potential differences produces motion in the tweezer arms which is a function of the time during which the potentials are applied and which is a function of the magnitude of such potentials.

In accordance with a preferred form of the process of the present invention, a layer of low pressure CVD silicon dioxide is applied to a wafer coated with a thin silicon nitride layer, the latter layer serving to ensure insulation between the substrate and the tungsten beams produced by the process. A thin silicon nitride layer is deposited as an implantation mask on the top of the silicon dioxide layer and the mask is patterned to obtain vertical resist profiles. The channels for the tungsten beams are then formed in the silicon dioxide layer by reactive ion etching. After the photoresist is removed, silicon atoms are implanted in the bottom of the channels. Thereafter, the silicon nitride mask is removed and a tungsten film is selectively deposited to fill the implanted oxide channels. An isolation mask is applied to etch the oxide surrounding the tungsten channels to thereby free the tungsten beams. In a preferred form of the invention, the beams are then covered with a conformal coating of CVD silicon dioxide to provide a thin insulating layer on the beams.

Although the substrate preferably is silicon or gallium arsenide, it will be apparent that any substrate that can receive the thin silicon nitride and the CVD silicon dioxide layers can be used. The silicon or gallium arsenide substrates are preferred, however, when the microtweezers are to be incorporated into electronic circuitry such as VLSI circuits.

In a modified version of the invention, the channels are formed in an oxide layer which is formed over a polysilicon layer, which in turn is formed on the thin silicon nitride layer on the wafer. The channels expose the polysilicon layer, which then acts to seed the CVD tungsten which is deposited to form the tungsten beams. The cavity formed around the beam exposes the nitride layer under the beams to free them, as before, with the nitride layer remaining as an insulator on the top surface of the substrate.

In a still further modification of the invention, the substrate may be a silicon wafer formed by a Simox process, wherein a silicon substrate is covered by a thin layer of silicon dioxide which in turn is covered by a thin layer of silicon. This commercially available wafer is then covered by an oxide layer such as CVD silicon dioxide, and trenches are formed therein, as discussed above. These trenches extend down to the thin layer of silicon, so taht CVD tungsten will seed in the trenches without the need for ion implantation. A cavity is then formed around the beams to release them, as previously described.

The tungsten beams are extensions of the tungsten microcircuit conductors formed in a silicon dioxide layer, and extend in cantilever form from the silicon dioxide layer into the formed cavity. The beams are elongated and are substantially square in cross-section, and extend substantially parallel to the floor of the cavity. Upon application of a potential across the beams, the beams move toward or away from each other, while application of a potential difference between a beam and the substrate will cause the beam to move toward or away from the substrate.

In carrying out the foregoing process, tungsten beams have been fabricated having a length of 200 micrometers, a height of 2.7 micrometers and a width of 2.5 micrometers. Such beams have been moved in a controlled manner by the application of selected voltages.

BRIEF DESCRIPTION OF THE DRAWINGS

The foregoing and additional objects, features and advantages of the invention will become apparent to those of skill in the art from a consideration of the following detailed description of a preferred embodiment, taken in conjunction with the accompanying drawings, in which:

FIG. 1 is a perspective view of tungsten beams forming microtweezers in accordance with the present invention;

FIG. 2 is a diagrammatic top view of the tweezers of FIG. 1;

FIG. 3 is a side view of the tweezers of FIG. 1;

FIG. 4 is an end view of one of the tweezer beams of FIG. 2;

DESCRIPTION OF PREFERRED EMBODIMENT

Figure 5:
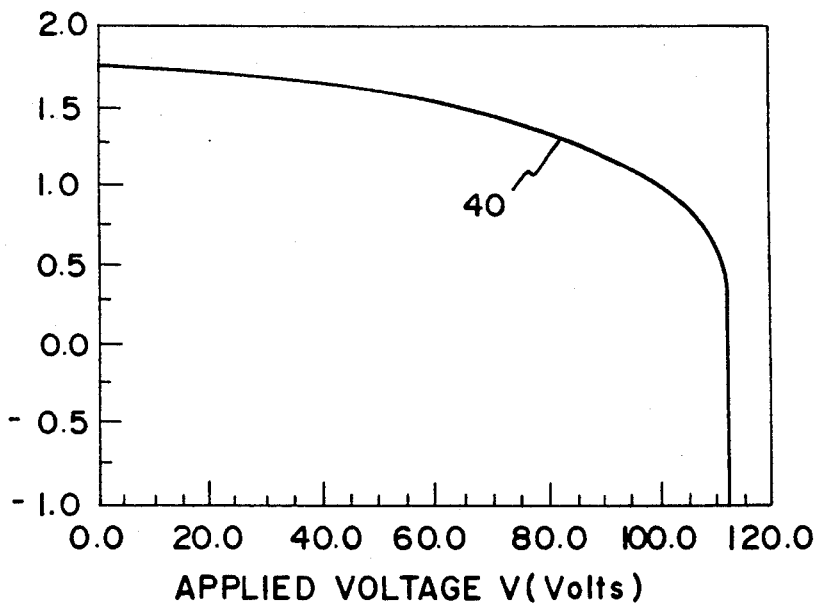
FIG. 5 is a graphical depiction of the free end deflection of one tweezer arm as a function of the applied voltage between the tweezer arms of FIG. 1.

Turning now to a more detailed consideration of the present invention there is illustrated in FIG. 1 a segment 10 of a microcircuit incorporating a pair of three-dimensional cantilever beams 14 and 16 fabricated from a material such as tungsten in accordance with the present invention. The microcircuit is formed on a substrate or base 18 which in a preferred form of the invention is a silicon or a gallium arsenide wafer, but which may be any material capable of receiving an insulating layer 20 of, for example, silicon nitride. A layer of CVD silicon dioxide 22 covers the layer 20, with the beams 14 and 16 being formed in a cavity 24 created in the silicon dioxide layer. The beams are embedded in the silicon dioxide layer 22 at their near ends 26 and 28, respectively, and extend outwardly in a cantilever fashion from one face 29 of the cavity 24 with their far, or free ends 30 and 32, respectively, being suspended in the cavity and above the bottom surface 34 thereof. The beams 14 and 16 lie in a common X-Y plane which may be parallel to the surface 34 and are free to move in this plane and in a Z direction perpendicular to the X-Y plane. The near ends of the beams 26 and 28 are formed as a part of, and thus are connected to, metal circuit connector lines 36 and 38, respectively, in the illustrated embodiments. These circuit lines may lead, for example, to external contacts or other circuit components for supplying voltages to the respective beams 14 and 16 to thereby actuate the beams in a manner to be described. The two beams 14 and 16 in the illustrated embodiment can be moved toward and away from each other upon application of appropriate voltages between the beams, and accordingly can perform the function of microtweezers. In one form of the invention, the beams may be formed of material exhibiting piezoelectric characteristics, so that motion of the beams by externally applied forces results in the generation of electrical signals which can be detected by the microcircuit to which the beams are connected.

As illustrated in FIGS. 2, 3 and 4, the beams are generally rectangular in cross section and are capable of deflection through an angle $\theta$, with the deflection occurring over the full length L of the beam, and with the total motion away from the initial position defined by axis x being identified in FIG. 4 by u(x). In FIG. 2 this deflection is shown in the X-Y plane, but it will be apparent that a similar deflection can also be produced in the Z direction. In one form of the invention, the length L may be 200 micrometers, the width w of the beam may be about 2.5 micrometers, and the height h of the beam may be about 2.7 micrometers.

The beams 14 and 16 are rigidly fixed at their inner ends at cavity wall 29, which coincides with the axis y diagrammatically illustrated in FIG. 2, but are free to deflect over their entire length L. When a step function potential difference is applied between the arms 14 and 16, as by applying potentials to the lines 36 and 38, an attracting or repelling electrostatic force occurs between the charged arms, depending on the polarity of the potential. The arms act as electrodes, so the tweezers can be mathematically modeled as an air gap capacitor, and the distance between the two arms, d(x, t), is given by the following equation:

$$d(x,t) = d_0 + 2u(x,t), \quad \text{(Eq.1)}$$

where u(x, t) is the deflection of one arm away from the x axis, at any given position x along the tweezer arm, and where the potential is supplied to the arms for a time t greater than 0. The spacing between the tweezer arms 14 and 16 is illustrated at $d_0$ in FIG. 1 and in FIG. 2. The total capacitance density, c(x, t), along the two arms 14 and 16 is the combination of the fringing capacitance and the plate capacitance, and is given by the following equation:

$$C(x,t) = \frac{\epsilon_0}{\pi} Ln\left(\frac{2(1 + A(x,t))}{1 - A(x,t)}\right) + \frac{\epsilon_0 h}{d(x,t)}, \quad \text{(Eq. 2)}$$

where $$A(x,t) = \sqrt{1 - \left(\frac{d(x,t)}{d(x,t) + 2w}\right)^2},$$

where $\epsilon_0$ is the dielectric constant between the tweezer arms and h is the height of the tweezer arm, as indicated above. Equation 2 is an approximate expression to account for the fringing capacitance.

The force density F(x, t), per unit length along one of the arms due the attraction of the other arm is given by the following equation:

$$F(x,t) = \quad \text{(Eq. 3)}$$

$$\frac{V^2 C(x,t)}{4\pi\epsilon_0} \int_0^L \frac{C(x',t)(d_0 + u(x,t) + u(x',t))}{((x - x')^2 + (d_0 + u(x,t) + u(x',t))^2)^{3/2}} dx'$$

Since the total deflection of the tweezer arm at the free end thereof is made much smaller than its length, the Euler-Bernoulli beam equation, including the damping and external forcing terms for each arm, is given by the following equation:

$$EI\frac{\partial^4 u(x,t)}{\partial x^4} + m\frac{\partial^2 u(x,t)}{\partial t^2} + P\frac{\partial u(x,t)}{\partial t} = F(x,t), \quad \text{(Eq. 4)}$$

where E is the Young's modulus for tungsten; $M = \mu mw$ is its mass density per unit length: $\mu$ the volume mass density; $I = h w^3/12$ is its moment of inertia; and P is the damping coefficient.

In order to solve the equation for the deflection of the tweezers in the dynamic case, the partial differential equation 4 is replaced by a set of difference equations using the central difference scheme. The scheme is explicit and is stable when the temporal increment is sufficiently small compared with the spatial increment. In the static case, the time dependent terms vanish, and the resulting ordinary differential equation can be replaced by a set of algebraic equations.

In order to determine when the free ends of the tweezer arms 14 and 16 will touch in response to an applied potential, the deflection of tips 30 and 32 for different applied voltages may be simulated, with the results of such simulations being illustrated in FIG. 5. In this Figure, curve 40 illustrates the free end deflection of one tweezer arm as a function of the applied voltage between the two tweezer arms. As illustrated, for an applied voltage slightly above 112 volts, the deflection of the arm becomes unstable, and the tweezers close abruptly.

Figure 6:
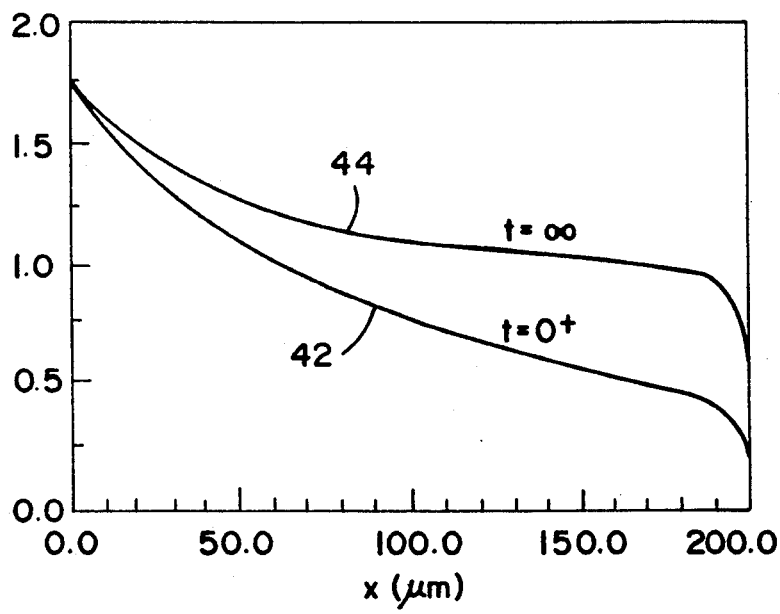
FIG. 6 is a graphical depiction of forced density distributions along the length of one tweezer arm.

FIG. 6 illustrates the force density distribution along one arm of the tweezers due to an applied voltage of 112 volts. Curve 42 illustrates the density distribution at time t=0 upon application of a step function input of 112 volts, while curve 44 illustrates the force density distribution at time t=infinity. As illustrated by these curves, initially when the tweezers arms are fully opened, the force density of attraction decreases along the length of the arm. However, when the arms are deflected toward each other, the force density decreases. For an applied voltage greater than 112 volts, the forced density increases rapidly and the two arms close.

Figure 7:
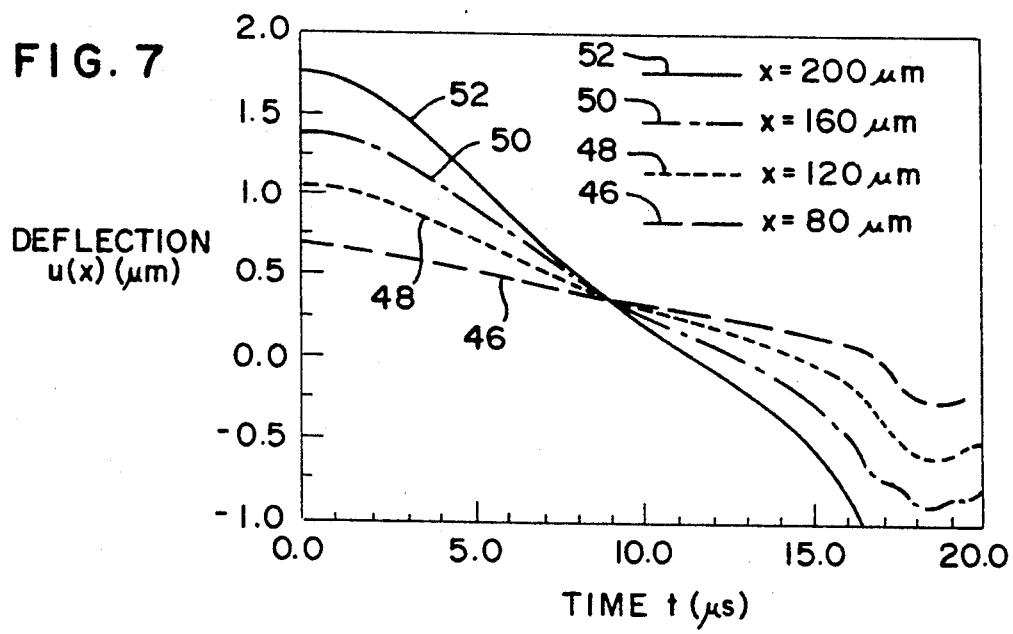
FIG. 7 is a graphical depiction of the dynamic beam deflection as a function of time for one tweezer arm.

FIG. 7 illustrates the dynamic beam deflection of one tweezer arm as a function of time and for positions along the beam upon application of a step input of 112 volts. Curves 46, 48, 50 and 52 illustrate the response at four points along the arm, where X=80, 120, 160 and 200 micrometers, respectively. In this case, the free ends touch at x=L=200 micrometers. At other positions along the length of the tweezers the arms may collide and bounce back and forth, exhibiting decaying vibrations. The dynamic response approaches a steady state after a short time. The damped responses are slower than the ones for the undamped case. The free ends for the undamped case exhibit increased vibrational motion.

Figure 8:
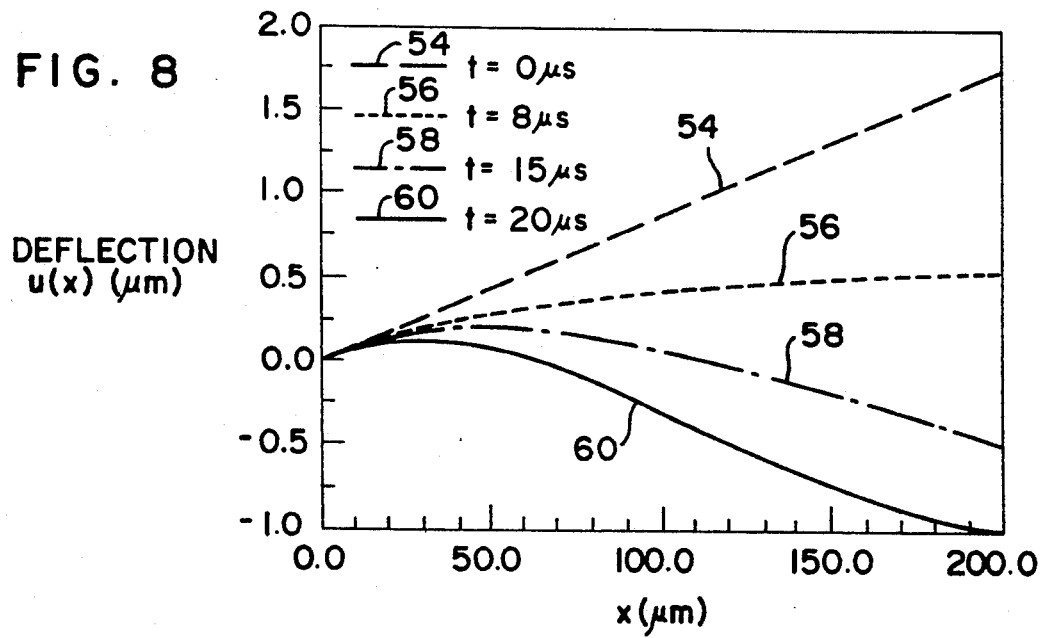
FIG. 8 is graphical depiction of the dynamic beam deflection as a function of position for one tweezer arm and for time.
Figure 9:
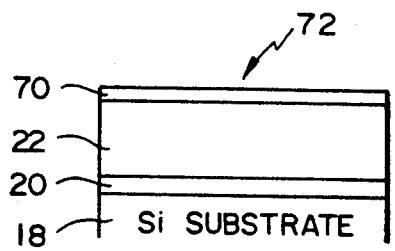
FIGS. 9 through 15 illustrate the steps in a process of fabricating the tweezer of FIG. 1.

FIG. 8 shows the dynamic beam deflection as a function of the position for one tweezer arm over a period of time upon application of a step function of 112 volts. Curves 54, 56, 58 and 60 show the spatial shapes of the tweezer arms for times t=0, 8, 15 and 20 microseconds, respectively. As illustrated in this Figure, the two arms will deflect and touch within 20 microseconds.

The foregoing simulations illustrated in FIGS. 5, 6, 7 and 8 are for voltages applied between the tweezer arms 14 and 16 or between one arm and a nearby, horizontally spaced electrode, to produce motion in the X-Y plane parallel to surface 34. In similar manner, the arms 14 and 16 can be deflected in a vertical direction by application of a suitable potential between a tweezer arm and a vertically spaced electrode such as the substrate 18. It has been found that the voltage required to cause one arm to touch the surface 34 is 117 volts when the arm is spaced above the surface 34 by a distance about equal to the thickness of the beam. These simulations describe the threshold voltage behavior at which the tweezer arms make a sudden, unstable, large deflection. This threshold voltage is determined by the tweezer geometry and the mechanical properties of the material used to fabricate the arms 14 and 16. In the preferred form of the invention, and in the simulations discussed above, this material was a CVD tungsten material.

As indicated above, the beams 14 and 16 function as electrodes, and move upon the application of electrostatic forces therebetween, or between one of the beams and an adjacent electrode. To produce vertical motion, the adjacent electrode may be the substrate 18, while horizontal motion is produced using the two beams as electrodes. It will be understood, however, that a single beam may be provided, with an adjacent, nonmovable electrode also being provided to produce horizontal motion, if desired.

The processing steps for the fabrication of a cantilever beam, and more particularly, for the fabrication of a pair of beams closely spaced together to form microtweezers of the type illustrated in FIG. 1, are based on the selective tungsten CVD technology described in U.S. Pat. No. 4,746,621. The processing sequence is outlined in FIGS. 9 through 15, to which reference is now made. The starting material is a substrate 18 which, for example, may be a three inch p-type silicon wafer. A silicon nitride layer 20 is placed on the wafer 18 to provide insulation between the substrate and the released tungsten microtweezer beams 16 and 18. Preferably, the layer 20 is about 100 nm thick. A layer 22 of low pressure CVD silicon dioxide, approximately 6 micrometers thick, is placed on the layer 20. A 100 nm thick silicon nitride layer 70 is then deposited on the silicon dioxide layer 22 for use as an implantation mask, thereby providing a composite wafer 72 on which the microdynamic structure of the present invention may be formed, along with suitable VLSI electronic circuit components, if desired.

Figure 10:
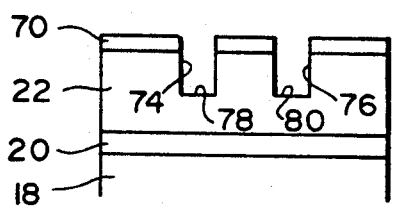

To form the beams from the wafer 72, a photoresist layer (not shown) is spun onto the top surface of the layer 70 and is exposed and developed in conventional manner to define a pattern for the channels in which the beams 14 and 16 are to be formed, and in which various interconnect lines may also be formed. A contrast enhancing material layer (not shown) is used with the photoresist for patterning to obtain vertical resist profiles. Channels 74 and 76 are then formed through the patterned resist material on layer 70 into the silicon dioxide layer 22, as illustrated in FIG. 10. These channels are formed by reactive ion etching of the composite dielectric structure 72 in a $CH_3$ ambient. The oxide channels 74 and 76 are etched to a depth of approximately 3.5 micrometers so that the bottom walls 78 and 80 of the channels are spaced above the top of layer 20 by about 2.5 micrometers. These channels may be parallel to each other, or may diverge or converge slightly, or may take other configurations as desired, with the channels serving as molds for the tungsten beams which are to be formed.

Figure 11:
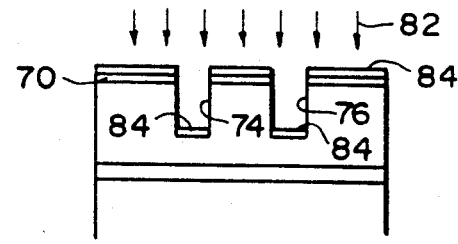

After the photoresist layer on top of layer 70 is removed by an oxygen plasma, silicon atoms at an energy of 40 KeV are implanted, as illustrated by the arrows 82 in FIG. 11. This step produces an implantation layer 84 in the bottom of channels 74 and 76, respectively, as well as on the silicon nitride layer 70. The silicon atoms are implanted at a dosage sufficient to initiate seeding of tungsten in the subsequent deposition step; for example, a silicon dosage of about $1 \times 10^{17}$ per square centimeter has been found to be sufficient to initiate the deposition of tungsten on silicon dioxide. The structure 72 is then subjected to an oxygen plasma to remove any carbon contamination encountered during the implantation. To expose the peak silicon concentration in the implanted oxide channels, buffered HF is used. It has been found that as an alternative a polysilicon material can be implanted for seeding the deposition of tungsten.

Figure 12:
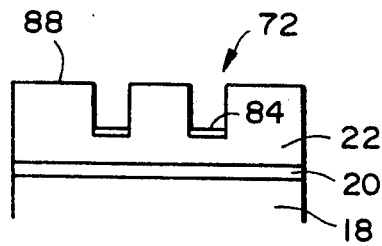

As illustrated in FIG. 12, upon completion of the silicon implantation, the silicon nitride layer 70 is selectively removed in a hot phosphoric acid solution, taking with it any silicon implantation which might have occurred on that layer. This leaves the composite dielectric structure 72 with a planar top surface 88 and channels 74 and 76 which is ready to receive the tungsten material which is to form the beams 14 and 16.

Figure 13:
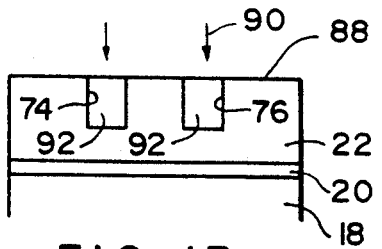

As illustrated in FIG. 13, a tungsten film is selectively deposited, as indicated by arrows 90, onto the composite structure 72 so as to fill the implanted oxide channels 74 and 76. The film may be deposited in a Genus 8432 cold wall reactor at a temperature of 580° C. The silicon layer 84 at the bottom of channels 74 and 76 facilitates the deposition of the tungsten in the channels and ensures good adhesion of the tungsten material. The deposition is selective, since tungsten does not adhere to dielectric oxides, and thus will not adhere to the top surface 88 of the layer 22. The tungsten fills the channels completely to provide tungsten conductor structures 92, with the walls of the channels providing the molds for shaping the tungsten. Preferably, the tungsten fills the channels completely to provide planar top surfaces which are level with the planar surface 88 of the wafer.

Figure 14:
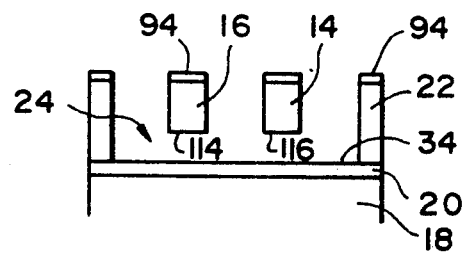

As illustrated in FIG. 14, an isolation mask 94 is deposited on the top wall 88 of the wafer 72 to mask the beams, and the cavity 24 is etched in the silicon dioxide layer 22. This etching step removes the silicon dioxide material from around the beams 14 and 16 to release the beams, leaving the ends 26 and 28 embedded in the silicon dioxide material for support purposes (see FIG. 1), but allowing the length 1 of the beams 14 and 16 to extend outwardly from the wall 29 into the cavity 24. In the illustrated embodiment, the beams are spaced above the floor 34 of the channel and generally extend parallel to each other and to the channel floor. The silicon dioxide layer preferably is removed down to the silicon nitride layer 20 to expose the top surface thereof, and the isolation mask layer 94 is then removed from the wafer 72. The resulting three-dimensional tungsten beams are movable both horizontally and vertically, and the tungsten metal is substantially stress-free.

Because the motion of the beams can bring them into contact with each other and because such contact can produce an electrical short circuit of the voltage source supplying the potential to the beams, and can destroy the beams, it has been found desirable to electrically insulate the beams. This can be accomplished by placing the wafer 72 in a furnace for application of a conformal coating of CVD silicon dioxide, as indicated by the arrows 96 and the layer 98 surrounding each of the beams 14 and 16 in FIG. 15. Preferably, this coating is about 200 nm thick on each of the beams so that there wil be a 400 nm insulating layer between the arms 14 and 16 when they come into contact. Although this coating process is quite effective and is easy to carry out, it does result in a composite beam, which may, in some circumstances, be undesirable. An alternative form of insulation between the two beams is illustrated in FIG. 1, where a pair of insulating pads 110 and 112 are provided on the opposing surfaces of the tip portions 30 and 32 of the beams 14 and 16. These pads may be of an oxide material which is left on the beam by appropriate masking during the step of removing the oxide material 22 during formation of cavity 24 (see FIGS. 13 and 14), or may be insulating material deposited on the beam tips by other suitable processes during the fabrication of the beam.

Figure 16:
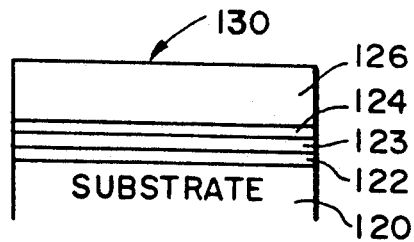
FIGS. 16–20 and 21–25 illustrate the steps in alternative fabrication processes.

Although the foregoing process of fabricating the beams works quite well, it has been found that the bottom surfaces 114 and 116 of the beams (see FIG. 14) may be somewhat rough because of the silicon implantation step, and this may be a disadvantage in some applications. Accordingly, as an alternative, the beams may be formed in accordance with the process illustrated in FIGS. 16-20 so as to facilitate production of beams having smooth bottom surfaces. In the modified form of the invention as illustrated in FIG. 16, a substrate 120 such as a p-type silicon wafer is coated with a layer 122 of silicon nitride. This layer 122 is then covered by a layer 123 of an oxide material such as silicon dioxide, which is then covered by a layer 124 of a polycrystalline silicon material, or polysilicon. This layer 124 is, in turn, covered by a silicon dioxide layer 126 to produce a composite wafer structure 130.

Figure 17:
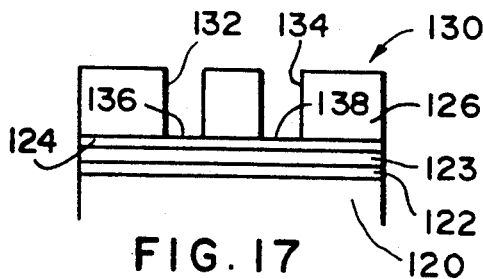
Figure 18:
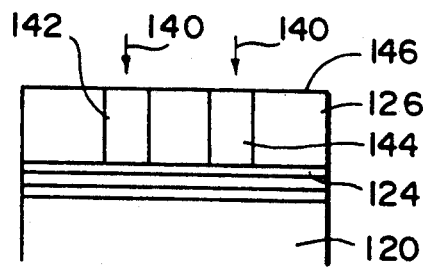
Figure 19:
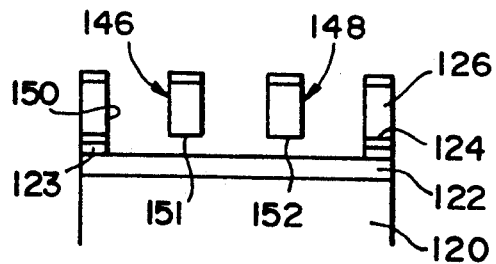

As illustrated in FIG. 17, channels 132 and 134 are etched through the layer 126, so that the bottom walls 136 and 138 of the channels are formed by the top surface of the polysilicon layer 124. Tungsten may then be selectively deposited on the wafer 130, as indicated by arrows 140 in FIG. 18, thereby filling the channels to form the tungsten structures 142 and 144. CVD tungsten seeds on the polysilicon material 124 at the bottom walls of the channels, but not on the top surface 146 of the silicon dioxide layer 126.

The tungsten cantilever beams 146 and 148 are released from the silicon dioxide layer 126 by etching a cavity 150 in the manner discussed above, with the cavity 150 extending through the polysilicon layer 124 and the silicon dioxide layer 123 to free the beams and to space the bottom surfaces 151 and 152 of the beams from the top surface of silicon nitride layer 122. The beams will remain generally parallel to the bottom surface of the cavity, even after they have been freed from the silicon dioxide molds, so that, if desired, the layer 122 can also be removed from the cavity. The bottom surfaces 151 and 152 of the beams contact the top surface of the polysilicon layer during formation of the beams and because this layer is relatively smooth as compared to the surfaces 136 and 138 of the silicon implantation, the result is smoother bottom surfaces for the beams. Such smoother surfaces facilitate horizontal movement of the beams.

Figure 15:
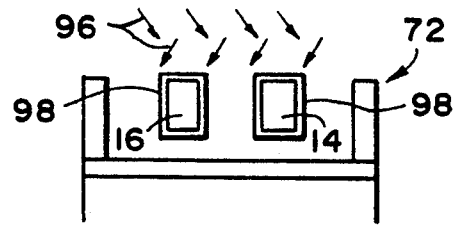
Figure 20:
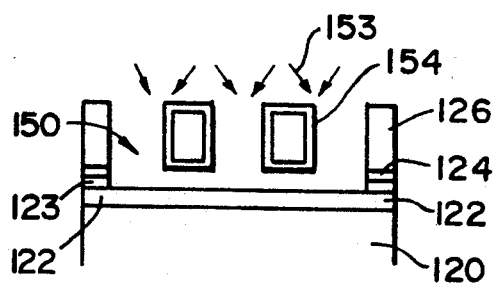
Figure 21:
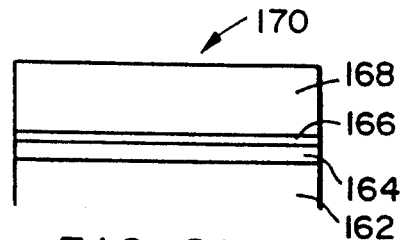

The beams may be subjected to CVD silicon dioxide as illustrated by arrows 153 to produce a conformal insulating layer 154, as shown in FIG. 20, and as described with respect to FIG. 15.

Figure 22:
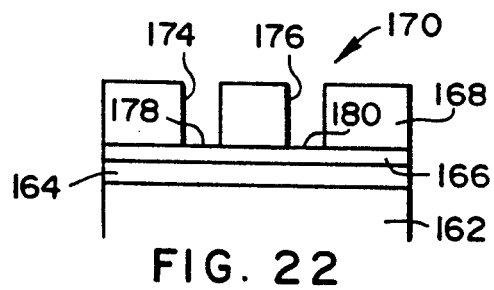

A still further modification of the foregoing fabrication process is illustrated in FIGS. 21-25, and utilizes wafers produced by a recent technology for placing a single crystal silicon layer on an insulator. These wafers, produced by the Simox process, are commercially available, and consist of a silicon substrate 162, a silicon dioxide layer 164, and a thin single crystal silicon layer 166 (see FIG. 21). A second CVD silicon dioxide layer 168 covers the crystal 166 to produce the composite wafer 170. As shown in FIG. 22, channels 174 and 176 are formed through the layer 168 in the manner previously described, with the bottom walls 178 and 180 of the channels being formed by the top surface of the crystalline layer 166.

Figure 23:
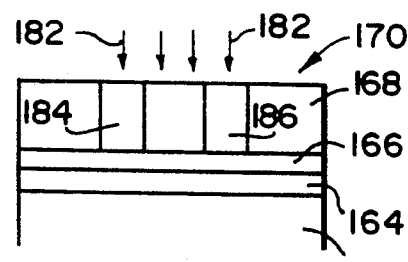

CVD tungsten is applied to the composite wafer, as previously described, and as shown by arrows 182 in FIG. 23, to fill the channels 174 and 176. The tungsten seeds on the silicon crystal 166 and fills the channels to form the tungsten structures 184 and 186.

Figure 24:
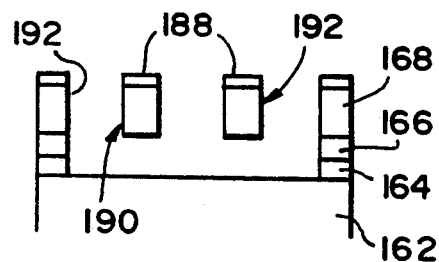
Figure 25:
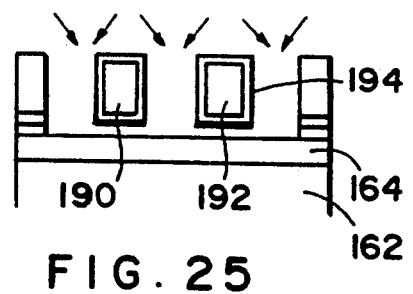

The structures 184 and 186 are freed from the surrounding silicon dioxide material 168 by etching away the silicon dioxide layer 168, the underlying silicon crystal 166, and the silicon dioxide layer 164, for example through a mask 188, to form cavity 192, as illustrated in FIG. 24. The freed structures form cantilever beams 190 and 192, with the bottom surfaces of the tungsten beams being spaced above the top surface of the silicon substrate 162. Thereafter, the beams may be provided with a CVD silicon dioxide coating 194, as illustrated in FIG. 25 and as previously described. The use of a silicon crystal layer 166 provides a smooth bottom surface for the tungsten beams.

A significant advantage of the CVD tungsten technology used in the fabrication of the cantilever beams described herein is that multilayer devices can be made easily, since this technology provides planar top surfaces, as described in the aforesaid U.S. Pat. No. 4,746,621.

In the production of tweezers in accordance with the present invention, two tweezer structures have been designed, fabricated and tested. The first tweezer design was similar to that illustrated in FIG. 1, but with non-coated tungsten arms. This design was used to evaluate the accuracy of the simulated threshold voltages of 112 volts described hereinabove. However, because of the lack of insulation, that design could not be used for reliably repetitive closure of the tweezers, because tweezer closure produced electrical shorting and destruction of the device. The second tweezer design was a composite beam in accordance with FIG. 1, but including the CVD silicon dioxide coating illustrated in FIG. 15. This coating prevented electrical shorting and produced a threshold voltage in the range of 135 to 155 volts. In tests of the tweezer design of FIG. 15, scanning electron microscope (SEM) micrographs illustrated the motion of the microtweezers under test. Small deflections were first observed at 145 volts, with a sudden, full deflection being observed at 150 volts, this behavior agreeing well with the simulated results illustrated in FIGS. 5 to 8. In tests, it was found that to reopen the tweezer, the applied voltage must be reduced well below the threshold voltage. For example, reopening was obtained when the applied voltage was reduced to 60 volts. Tests were conducted with the voltage being applied across the beams, to produce motion in the X-Y plane parallel to the surface 34. In addition, tests were conducted to produce downward deflection of the beam in the Z-direction to cause the beam to contact the silicon nitride layer 20. The measured vertical threshold voltage applied between the arm and the silicon substrate 18 to produce full vertical deflection was 150 volts.

Thus, there has been provided a three-dimensional tungsten cantilever beam, and selective chemical vapor deposition tungsten processes for fabricating such beams on a substrate. Two beams have been formed to produce micromechanical tweezers that move in three dimensions when potential differences are applied between the tweezer arms to produce X-Y motion and between the tweezer arms and the silicon substrate to produce motion in the Z direction. Although the present invention has been described in terms of preferred embodiments, variations and modifications will be apparent to those of skill in the art. Thus, the true spirit and scope thereof is limited only by the following claims.

What is claimed is:

1. A method of forming a microdynamic structure, comprising:
    forming on a top surface of a substrate wafer a first dielectric layer; forming a second layer of silicon dioxide on a top surface of said first layer to produce a composite dielectric wafer;
    patterning and etching said composite dielectric wafer to produce at least one channel in said wafer, said channel extending partially through said second layer and having a bottom wall in said silicon dioxide layer, the bottom wall being spaced above said top surface of said first layer;

implanting silicon in said silicon dioxide bottom wall of said channel;

selectively depositing a refractory metal in said channel to fill said channel;

depositing an isolation mask on said first layer to and on said refractory metal to mask said refractory metal in said channel;

etching said silicon dioxide layer in the region surrounding at least a part of said metal-filled channel to produce a cavity and to free said metal to provide a cantilever beam extending into said cavity.

2. The method of claim 1, further including removing said isolation mask.

3. The method of claim 2, further including applying a thin film layer of insulating material on said beam.

4. The method of claim 2, wherein the step of patterning and etching produces two spaced channels, whereby two cantilever beams are produced in said cavity.

5. The method of claim 4, further including applying an electrical potential across said beams to produce an electrostatic force therebetween for mechanical deflection of said beams.

6. The method of claim 2, further including applying an electrical potential between said beam and said substrate to produce an electrostatic deflection force on said beam.

7. The method of claim 6, wherein the step of applying an electrical potential includes applying a step voltage to said beam.

8. The method of claim 1, wherein the step of depositing a refractory material includes chemical vapor deposition of tungsten, said tungsten seeding on said implanted silicon in said channel.

9. The method of claim 8, wherein the step of patterning and etching includes forming a third layer of silicon nitride on the top surface of said second layer, said third layer forming a mask for said channel.

10. A method of forming a microdynamic structure comprising:

providing a wafer including an insulating layer covered by a tungsten seeding layer:

depositing a layer of silicon dioxide on said tungsten seeding layer;

etching through said layer of silicon dioxide at least one elongated channel having a bottom wall formed by said tungsten seeding layer, said channel serving as a mold for formation of said microdynamic structure;

selectively depositing tungsten by chemical vapor deposition in said channel, said tungsten seeding in said channel on said bottom wall of said channel and filling said channel to form an elongated tungsten structure in said silicon dioxide layer; and selectively removing a portion of said silicon dioxide layer surrounding said tungsten-filled channel to form a cavity around at least a part of said tungsten structure to release said structure and to form a cantilever tungsten beam extending into said cavity.

11. The method of claim 10, further including applying an electrical insulator to the surface of said beam.

12. The method of claim 10, wherein the step of forming a cavity further includes removing said seeding layer from within said cavity.

13. The method of claim 10, further including applying a conformal coating of an electrically insulating oxide to surfaces of said beam.

14. The method of claim 10, further including applying conformal coating of silicon dioxide to surfaces of said beam.

* * * * *